(12) United States Patent
Jiang et al.

(10) Patent No.: US 12,540,776 B2
(45) Date of Patent: Feb. 3, 2026

(54) HEAT EXCHANGER

(71) Applicant: SANHUA (HANGZHOU) MICRO CHANNEL HEAT EXCHANGER CO., LTD., Hangzhou (CN)

(72) Inventors: Jianlong Jiang, Hangzhou (CN); Ruixue Xiao, Hangzhou (CN); Xiaoming Zhong, Hangzhou (CN); Zheng Wei, Hangzhou (CN)

(73) Assignee: SANHUA (HANGZHOU) MICRO CHANNEL HEAT EXCHANGER CO., LTD., Hangzhou (CN)

( * ) Notice: Subject to any disclaimer, the term of this patent is extended or adjusted under 35 U.S.C. 154(b) by 340 days.

(21) Appl. No.: 18/256,511

(22) PCT Filed: Dec. 6, 2021

(86) PCT No.: PCT/CN2021/135786
§ 371 (c)(1),
(2) Date: Nov. 14, 2023

(87) PCT Pub. No.: WO2022/121848
PCT Pub. Date: Jun. 16, 2022

(65) Prior Publication Data
US 2025/0283667 A1    Sep. 11, 2025

(30) Foreign Application Priority Data
Dec. 8, 2020  (CN) .......................... 202011444633.3

(51) Int. Cl.
*F28D 1/053*    (2006.01)
*F28D 1/04*     (2006.01)
(Continued)

(52) U.S. Cl.
CPC ....... *F28D 1/05366* (2013.01); *F28D 1/0426* (2013.01); *F28D 1/047* (2013.01); *F28F 1/22* (2013.01); *F28D 2021/0068* (2013.01)

(58) Field of Classification Search
CPC .................................................. F28D 1/05366
(Continued)

(56) References Cited

U.S. PATENT DOCUMENTS 3,976,128 A * 8/1976 Patel ....................... F25B 39/02
                                                165/174
5,551,506 A * 9/1996 Nishishita ............. F28F 9/0253
                                                228/183

(Continued)

FOREIGN PATENT DOCUMENTS

CN    101660870 A    3/2010
CN    102506523 A    6/2012
(Continued)

OTHER PUBLICATIONS

Written Opinion issued in Application No. PCT/CN2021/135786, mailed on Feb. 18, 2022 (9 pages).
(Continued)

*Primary Examiner* — Devon Lane
(74) *Attorney, Agent, or Firm* — Osha Bergman Watanabe & Burton LLP (57) ABSTRACT

A heat exchanger includes first to fourth tubes, and first and second heat exchange tubes. The second heat exchange tube includes a first bent section and a first straight section. The first bent section has a first end connected with the second tube and a second end connected with the first straight section. In the width direction, the projection of the second channel of the first heat exchange tube is located between the first channel of the first heat exchange tube and the first channel of the first bent section, and the first channel of the (Continued)

first bent section is located between the second channel of the first heat exchange tube and the second channel of the first bent section.

19 Claims, 7 Drawing Sheets

(51) Int. Cl.
    *F28D 1/047*     (2006.01)
    *F28F 1/22*     (2006.01)
    *F28D 21/00*     (2006.01)

(58) Field of Classification Search
    USPC .......................................................... 165/165
    See application file for complete search history.

(56) References Cited

U.S. PATENT DOCUMENTS

| | | | |
|---|---|---|---|
| 2008/0141707 A1* | 6/2008 | Knight | F28F 1/025 165/174 |
| 2011/0088883 A1* | 4/2011 | de la Cruz | F28F 1/022 165/173 |
| 2020/0191490 A1* | 6/2020 | Jin | F28D 1/0471 |
| 2021/0011749 A1 | 1/2021 | Kanakeshan et al. | |
| 2021/0285733 A1* | 9/2021 | Qi | F28D 1/05366 |

FOREIGN PATENT DOCUMENTS

| | | | | |
|---|---|---|---|---|
| CN | 102519181 A | | 6/2012 | |
| CN | 103644685 A | * | 3/2014 | ............. F28D 21/00 |
| CN | 203928853 U | | 11/2014 | |
| CN | 104915263 A | | 9/2015 | |
| CN | 210128532 U | | 3/2020 | |
| CN | 210128652 U | | 3/2020 | |
| CN | 210532743 U | | 5/2020 | |
| CN | 210689278 U | * | 6/2020 | ............. F28F 1/128 |
| CN | 111880981 A | | 11/2020 | |
| CN | 211855020 U | | 11/2020 | |
| JP | S59124973 U | | 8/1984 | |
| JP | 2007057176 A | | 3/2007 | |
| JP | 2010060274 A | | 3/2010 | |
| JP | 2014037899 A | | 2/2014 | |
| JP | 2015113983 A | | 6/2015 | |

OTHER PUBLICATIONS

International Search Report issued in Application No. PCT/CN2021/135786, mailed on Feb. 18, 2022 (5 pages).
Office Action issued in Chinese Application No. 202011444633.3, mailed on Oct. 14, 2022 (17 pages).
Office Action issued in Chinese Application No. 202011444633.3, mailed on Mar. 27, 2023 (10 pages).
International Search Report issued in Application No. PCT/CN2021135786, mailed on Sep. 9, 2024 (8 pages).
Office Action issued in Japanese Application No. 2023-535072, mailed on Sep. 24, 2024 (11 Pages).
Extended European Search Report issued in European Application No. 22847523.2 mailed on Mar. 14, 2024 (10 pages).

* cited by examiner

HEAT EXCHANGER

CROSS-REFERENCE TO RELATED APPLICATION

The present application is a national phase entry under 35 USC § 371 of International Application PCT/CN2021/135786, filed on Dec. 6, 2021, which claims priority to and benefits of Chinese Patent Application Serial No. 202011444633.3, filed on Dec. 8, 2020, the entire contents of which are incorporated herein by reference.

FIELD

The present disclosure relates to the technical field of heat exchangers, and in particular to a heat exchanger used in a refrigeration system.

BACKGROUND

Multi-refrigeration system air conditioner adopts multiple independent refrigerant circuits. In related art, the multiple refrigerant circuits may adopt a multi-channel heat exchanger as a heat exchanger shared by multiple systems, and the multi-channel heat exchanger in the system shares a fan system and a ventilation face. The multi-channel heat exchanger has a plurality of refrigerant channels arranged at intervals, when the heat exchanger is in operation, temperatures of refrigerant at refrigerant inlet and outlet of a heat exchange tube are quite different from a temperature of air, and the temperature of air flowing through different channels varies in a direction of air intake. Therefore, the heat exchange effect between the channels at the inlet and outlet of the heat exchange tube is quite different, which is not conducive to improving the overall heat exchange performance of the heat exchanger.

SUMMARY

A heat exchanger of embodiments of the present disclosure includes a first assembly including a first tube and a second tube; a second assembly including a third tube and a fourth tube; a plurality of heat exchange tubes, a peripheral contour of a cross section of the heat exchange tube being generally flat, the heat exchange tube including a plurality of channels extending along a length direction of the heat exchange tube, the plurality of channels being arranged at intervals in a width direction of the heat exchange tube, the plurality of channels including a first channel and a second channel, a flow sectional area of the first channel on the cross section of the heat exchange tube being larger than flow sectional areas of other channels on the cross section of the heat exchange tube, and a flow sectional area of the second channel on the cross section of the heat exchange tube being smaller than flow section areas of other channels on the cross section of the heat exchange tube; the plurality of heat exchange tubes including a first heat exchange tube and a second heat exchange tube, a first end of the first heat exchange tube in the length direction being communicated with the first tube, and a second end of the first heat exchange tube in the length direction being communicated with the third tube, to communicate the first tube and the third tube; one end of the second heat exchange tube in the length direction being communicated with the second tube, and the other end of the second heat exchange tube in the length direction being communicated with the fourth tube, and the second heat exchange tube including a first bent section and a first straight section, a first end of the first bent section being communicated with the second tube, and a second end of the first bent section being communicated with a first end of the first straight section, and the first heat exchange tube and the second heat exchange tube being arranged at intervals in the length direction of the first tube; and a fin including a first fin, at least part of the first fin being connected with the first heat exchange tube and at least part of the first fin being connected with the second heat exchange tube in the length direction of the first tube, and the first heat exchange tube, the first fin and the second heat exchange tube are sequentially arranged in the length direction of the first tube, and two or more first fins are provided. A plane perpendicular to the length direction of the first tube and parallel to the width direction and the length direction of the first heat exchange tube is defined as a first plane, in the first plane, a length direction of a projection of a partial tube section of the first bent section of the second heat exchange tube is at an angle with a length direction of a projection of the first straight section of the second heat exchange tube, and in the width direction of the first heat exchange tube, a projection of the second channel of the first heat exchange tube is located between the first channel of the first heat exchange tube and the first channel of a part of the first bent section, and the first channel of the first bent section is located between the second channel of the first heat exchange tube and the second channel of the first bent section.

DETAILED DESCRIPTION

Reference will be made in detail to embodiments of the present disclosure, and examples of the embodiments are illustrated in the accompanying drawings. The embodiments described herein with reference to drawings are illustrative, and used to generally understand the present disclosure. The embodiments shall not be construed to limit the present disclosure. In the description of the present disclosure, terms indicating an orientation or positional relationship such as "central", "longitudinal", "lateral", "length", "width", "thickness", "up", "down", "front", "rear", "left", "right", "vertical", "horizontal", "top", "bottom", "inner", "outer", "clockwise", "counterclockwise", "axial", "radial" and "circumferential" as well as derivative thereof, should be construed as the orientation as then described or as shown in the drawings under discussion. These relative terms are for convenience of description and do not intend to indicate or imply that the devices or elements referred to must have a specific orientation, and be constructed and operated in a specific orientation, and therefore should not be construed as limiting the present disclosure.

Figure 2:
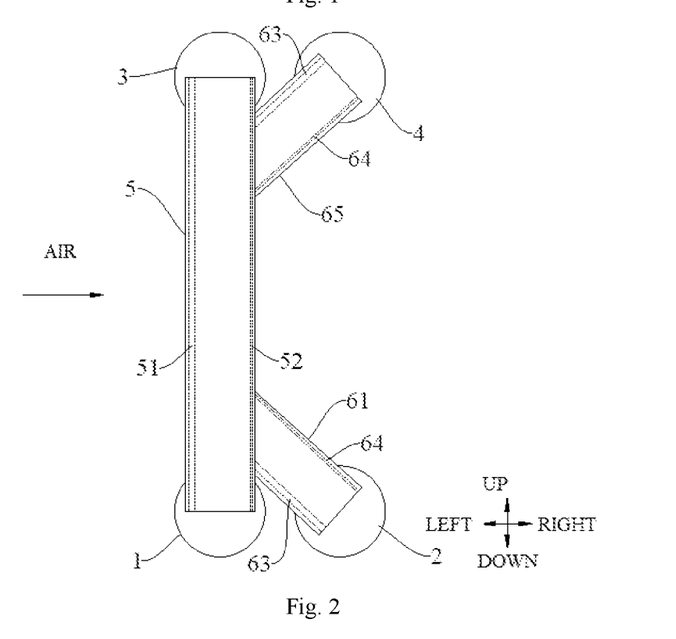
FIG. 2 is a schematic side view of an overall structure of a heat exchanger according to an embodiment of the present disclosure.
Figure 3:
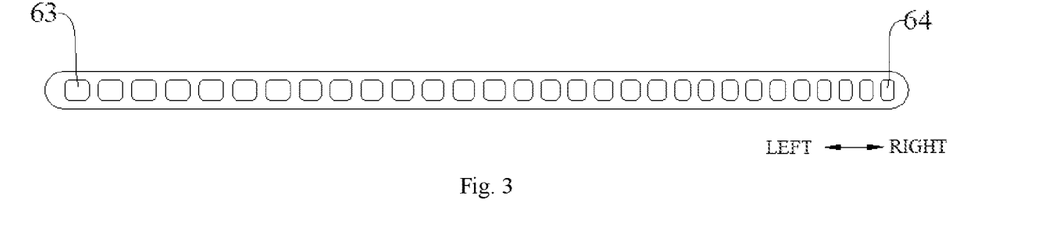
FIG. 3 is a schematic view of a cross section of a heat exchange tube of the heat exchanger in FIG. 2.

As shown in FIGS. 2 and 3, a heat exchanger according to embodiments of the present disclosure includes a first assembly, a second assembly, a plurality of heat exchange tubes and a fin (not shown). The first assembly includes a first tube 1 and a second tube 2, and the second assembly includes a third tube 3 and a fourth tube 4. The second assembly is located above the first assembly. Specifically, in this embodiment, the third tube 3 is located above the first tube 1 and the fourth tube 4 is located above the second tube 2.

A peripheral contour of a cross section of the heat exchange tube is generally flat, and the heat exchange tube includes a plurality of channels arranged along its length direction. The plurality of channels are arranged at intervals in a width direction of the heat exchange tube. The plurality of channels include a first channel and a second channel, a flow sectional area of the first channel on the cross section of the heat exchange tube is larger than flow sectional areas of other channels on the cross section of the heat exchange tube, and a flow sectional area of the second channel on the cross section of the heat exchange tube is smaller than flow sectional areas of other channels on the cross section of the heat exchange tube.

Specifically, as shown in FIG. 3, in this embodiment, the heat exchange tube is a flat tube, and the heat exchange tube is internally provided with a plurality of channels. The channels in the heat exchange tube can be divided into a first channel and a second channel according to a size of the flow sectional area. In the same heat exchange tube, the flow sectional area of the first channel is the largest, and the flow sectional area of the second channel is the smallest. It can be understood that in this embodiment, the heat exchange tube can only include a plurality of first channels and a plurality of second channels, the plurality of first channels and the plurality of second channels are arranged at intervals along the width direction (a left-and-right direction in FIG. 3) of the heat exchange tube, and the plurality of first channels are located on a left side of the heat exchange tube and the plurality of second channels are located on a right side of the heat exchange tube. In some other embodiments, a plurality of third channels, a plurality of fourth channels and other channels can be arranged between the first channel and the second channel of the heat exchange tube. It should be noted that a flow sectional areas of the third channel, the fourth channel or the other channel located between the first channel and the second channel is between the flow sectional area of the first channel and the flow sectional area of the second channel.

The heat exchange tube includes a first heat exchange tube 5 and a second heat exchange tube 6. One end of the first heat exchange tube 5 in the length direction is communicated with the first tube 1, and the other end of the first heat exchange tube 5 in the length direction is communicated with the third tube 3 to communicate the first tube 1 and the third tube 3. One end of the second heat exchange tube 6 in the length direction is communicated with the second tube 2, and the other end of the second heat exchange tube 6 in the length direction is communicated with the fourth tube 4. The second heat exchange tube 6 includes a first bent section 61 and a first straight section 62. One end of the first bent section 61 is communicated with the second tube 2, and the other end of the first bent section 61 is communicated with one end of the first straight section 62. The first heat exchange tube 5 and the second heat exchange tube 6 are arranged at intervals in the length direction of the first tube 1.

Specifically, the heat exchange tubes in this embodiment can be divided into the first heat exchange tube 5 and the second heat exchange tube 6, and the first heat exchange tube 5 and the second heat exchange tube 6 are arranged at intervals in the length direction of the first tube 1 (a direction perpendicular to the page in FIG. 2). It should be noted that in this embodiment, a plurality of first heat exchange tubes 5 and a plurality of second heat exchange tubes 6 may be provided, and the plurality of first heat exchange tubes 5 and the plurality of second heat exchange tubes 6 are alternately arranged at intervals along the length direction of the first tube 1.

As shown in FIG. 2, the first heat exchange tube 5 is a straight and flat tube, one end of the first heat exchange tube 5 in the length direction (an up-and-down direction in FIG. 2) is communicated with the first tube 1, and the other end of the first heat exchange tube 5 in the length direction is communicated with the third tube 3. When the heat exchanger is in operation, a refrigerant flows through the first tube 1, the first heat exchange tube 5 and the third tube 3 sequentially.

As shown in FIG. 2, in this embodiment, the second heat exchange tube 6 includes a first bent section 61 and a first straight section 62, the first straight section 62 is parallel to the first heat exchange tube 5, one end of the first bent section 61 is communicated with one end of the first straight section 62, and the other end of the first bent section 61 is communicated with the third tube 3. It should be noted that the other end of the first straight section 62 can be directly communicated with the fourth tube 4, and when the heat exchanger is in operation, the refrigerant will flow through the third tube 3, the first bent section 61, the first straight section 62 and the fourth tube 4 in sequence. In some other embodiments, the second heat exchange tube 6 may further include a second bent section 65, one end of the first straight section 62 is communicated with the first bent section 61, and the other end of the first straight section 62 is communicated with the second bent section 65. That is, the first bent section 61 is located between the first straight section 62 and the third tube 3, and the second bent section 65 is located between the first straight section 62 and the fourth tube 4. In this embodiment, the length direction (from upper left to lower right in FIG. 2) of a partial tube section of the first bent section 61 and the length direction (an up-and-down direction in FIG. 2) of the first straight section 62 are at an obtuse angle.

Figure 1:
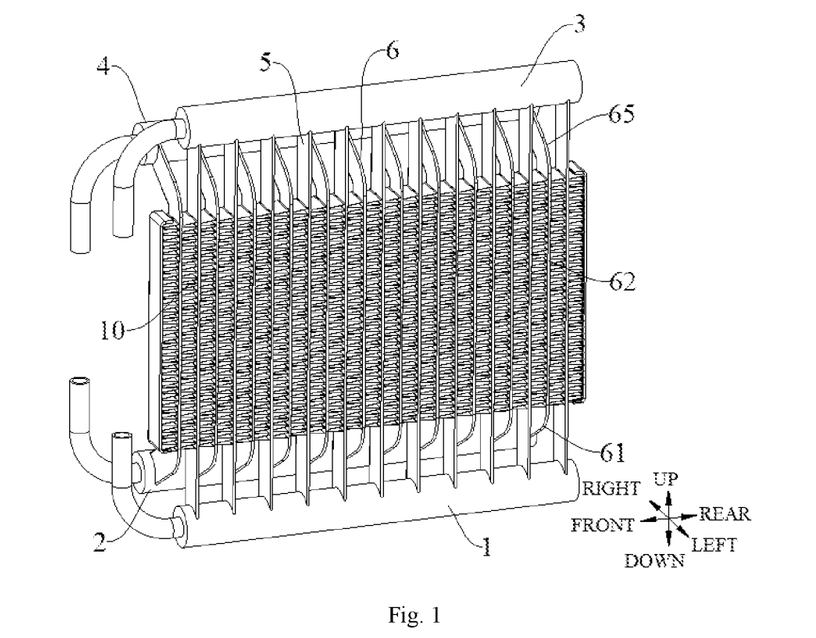
FIG. 1 is a schematic perspective view of an overall structure of a heat exchanger according to an embodiment of the present disclosure.

As shown in FIG. 1, the fin includes a first fin 10, at least part of the first fin 10 is connected with a first heat exchange tube 5 and at least part of first fin 20 is connected with a second heat exchange tube 6 in the length direction of the first tube 1 (a front-and-rear direction in FIG. 1). The first heat exchange tube 5, the first fin 10 and the second heat exchange tube 6 are arranged in sequence in the length direction of the first tube 1, and two or more first fins 10 are provided.

Specifically, since the first heat exchange tube 5 and the second heat exchange tube 6 are arranged at intervals along the length direction of the first tube 1, one side of the first fin 10 is connected with the first heat exchange tube 5, and the other side of the first fin 10 is connected with the second heat exchange tube 6. When a plurality of first heat exchange tubes 5 and a plurality of second heat exchange tubes 6 are provided, the first fins 10 are connected between adjacent first heat exchange tubes 5 and second heat exchange tubes 6.

A plane perpendicular to the length direction of the first tube 1 and parallel to the width direction and the length direction of the first heat exchange tube 5 is defined as a first plane, on the first plane, the length direction of a projection of the partial tube section of the first bent section 61 of a second heat exchange tube 6 is at an angle with the length direction of a projection of the first straight section 62 of the second heat exchange tube 6, and in the width direction of the first heat exchange tube, a projection of the second channel of at least one first heat exchange tube 5 is located between the first channel of the first heat exchange tube 5 and the first channel of the first bent section 61, and the first channel of at least one first bent section 61 is located between the second channel of the first heat exchange tube 5 and the second channel of the first bent section 61.

Specifically, as shown in FIG. 2, since the width direction of the first heat exchange tube 5 is the left-right direction, the length direction of the first heat exchange tube 5 is the up-down direction, and the length direction of the first tube 1 is the direction perpendicular to the page of FIG. 2, the first plane in this embodiment can be regarded as the page of FIG. 2. In the first plane, the projection of the first straight section 62 of the second heat exchange tube 6 coincides with the projection of the first heat exchange tube 5. The projection of the partial tube section of the first bent section 61 of the second heat exchange tube 6 is located behind the first straight section 62 of the second heat exchange tube 6, and an included angle formed by the projection of the first bent section 61 of the first heat exchange tube 5 and the projection of the first straight section 62 of the second heat exchange tube 6 is an obtuse angle.

In the first plane, a projection of at least one first channel (first heat exchange tube) 51 on the first plane, a projection of at least one second channel (first heat exchange tube) 52 on the first plane, a projection of at least one first channel (second heat exchange tube) 63 on the first plane and a projection of at least one second channel (second heat exchange tube) 64 on the first plane are arranged in sequence from left to right. It can be understood that in some other embodiments, the projection of at least one second channel (first heat exchange tube) 52 on the first plane, the projection of at least one first channel (first heat exchange tube) 51 on the first plane, the projection of at least one second channel (second heat exchange tube) 64 on the first plane and the projection of at least one first channel (second heat exchange tube) 63 on the first plane are arranged in sequence from left to right.

The heat exchanger of embodiments of the present disclosure utilizes a large heat exchange temperature difference at an inlet of the heat exchanger. At inlet and outlet ends of the heat exchange tube and near a joint between the heat exchange tube and the collecting tube (the first tube or the second tube), the heat exchange temperature difference between the refrigerant and the air is large, and the flow capacity of the refrigerant in the channel with large flow sectional area is also large, which is beneficial to improving the overall heat exchange performance. In some embodiments, the heat exchanger is installed in a position where the heat exchange tube is vertical and the collecting tube is horizontal, that is, the first tube and the second tube are below, and the third tube and the fourth tube are above, as an evaporator or an indoor side heat exchanger, and the refrigerant enters the heat exchanger from a lower collecting tube (the first tube or the second tube). When the second heat exchange tube is in operation, the refrigerant flowing into the first bent section 61 from the second tube 2 will experience gas-liquid separation under the action of gravity, and the refrigerant with more liquid phase will flow into the first channel (second heat exchange tube) 63. Because the flow sectional area of the first channel is larger than the flow sectional area of the second channel, more liquid-phrase refrigerant can flow into the first channel, and the heat exchange efficiency of the heat exchanger is further improved by utilizing the large heat exchange temperature difference. A plurality of heat exchange tubes of the heat exchanger in embodiments of the present disclosure are arranged in a specific order, thus the heat exchange efficiency and the heat exchange effect of the heat exchanger are improved.

Figure 4:
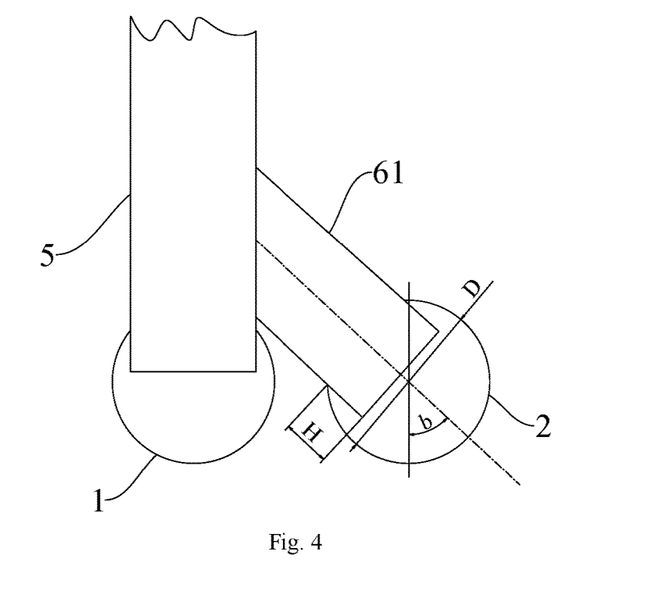
FIG. 4 is a schematic diagram of a partial structure of the heat exchanger in FIG. 2.

In some embodiments, as shown in FIG. 4, the first bent section 61 of the second heat exchange tube 6 is at least partially arranged in the second tube 2, and the maximum length of the partial tube section of the first bent section 61 arranged in the second tube 2 is H, and the equivalent diameter of the second tube 2 is D, and a ratio of the maximum length H to the equivalent diameter D is greater than or equal to ⅓ and less than or equal to ⅔.

Specifically, in this embodiment, the first bent section 61 extends into the second tube 2, and the maximum length of the tube section of the first bent section 61 extending into the second tube 2 is H. In this embodiment, the second tube 2 is a circular tube, and the equivalent diameter of the second tube 2 is D. The ratio of the maximum length H to the equivalent diameter D can be any value from ⅓ to ⅔, such as 0.34, 0.38, 0.4, 0.45, 0.5, 0.55, 0.6, 0.65, etc. Under actual working conditions, when the ratio of the maximum length H to the equivalent diameter D is too small, an end face of the first bent section 61 located in the second tube 2 is prone to not being immersed in liquid phase refrigerant, which further causes less liquid-phrase refrigerant to be sucked into the first channel (second heat exchange tube) 63, and affects the heat exchange efficiency. When the ratio of the maximum length H to the equivalent diameter D is too large, the length of the tube section of the first bent section 61 located in the second tube 2 is longer, which causes the flow resistance to increase and affects the heat exchange efficiency. Therefore, the ratio of the maximum length H to the equivalent diameter D should be within a suitable range to ensure that the heat exchanger has a good heat exchange effect. The design with the ratio of the maximum length H to the equivalent diameter D of ⅓ to ⅔ in this embodiment is a better scheme parameter obtained through many experiments, which ensures that the heat exchanger has a good heat exchange effect.

In some embodiments, as shown in FIG. 3, a plurality of first channels are provided and the plurality of first channels are arranged at intervals along the width direction of the heat exchange tube, and/or, a plurality of second channels are provided, and the plurality of second channels are arranged at intervals along the width direction of the heat exchange tube.

Specifically, the first heat exchange tube and the second heat exchange tube are both flat tubes, and FIG. 3 can be regarded as the cross sections of the first heat exchange tube and the second heat exchange tube. A plurality of first channels and a plurality of second channels are arranged in each of the first heat exchange tube and the second heat exchange tube, and the plurality of first channels and the plurality of second channels are arranged at intervals along the width direction of the heat exchange tube (a left-right direction in FIG. 3), and the plurality of first channels are all located on a left side of the plurality of second channels. It can be understood that in some other embodiments, a plurality of first channels and a plurality of second channels may be provided in one of the first heat exchange tube and the second heat exchange tube.

In some embodiments, as shown in FIG. 4, a projection of the second channel of at least one first heat exchange tube 5 on the first plane partially intersects with a projection of the first channel of at least one first bent section 61 on the first plane, and an included angle b of an intersecting part is greater than 20 degrees and less than 65 degrees.

Specifically, in this embodiment, an extension direction of the projection of the second channel of the first heat exchange tube 5 on the first plane is consistent with the length direction of the first heat exchange tube 5, and an extension direction of the projection of the first channel of the first bent section 61 on the first plane is consistent with the length direction of the first bent section 61, and the included angle b can be regarded as an included angle between the length direction of the first heat exchange tube 5 and the length direction of the first bent section 61. In this embodiment, the included angle b can be any value between 20° and 65°, such as 20°, 25°, 30°, 35°, 40°, 45°, 50°, 55°, 60°, 65° and so on. Under actual working conditions, when the included angle b is large, the bending difficulty between the first bent section 61 and the first straight section 62 will increase, thus increasing the process manufacturing difficulty of the heat exchanger and increasing the manufacturing cost of the heat exchanger. When the included angle b is small, there will be interference between the first tube and the second tube, and heat conduction to the second tube will occur when the first tube is in operation, or heat conduction to the first tube will occur when the second tube is in operation, which affects the heat exchange performance. Therefore, the value of included angle b should be kept in a suitable range. In this embodiment, the value of included angle b is between 20° and 65°, which is beneficial to further improvement of the heat exchange effect.

Figure 5:
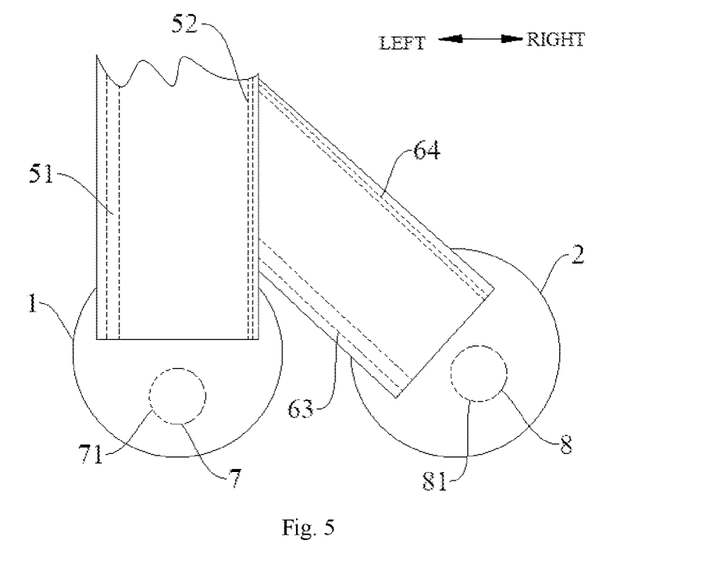
FIG. 5 is a schematic diagram of a first sub-tube and a second sub-tube of a heat exchanger according to an embodiment of the present disclosure.

In some embodiments, as shown in FIG. 5, the first tube 1 is internally provided with a first sub-tube 7, the first sub-tube 7 includes a flow channel and a tube wall surrounding the flow channel, a length direction of the flow channel is parallel to the length direction of the first tube 1, and the tube wall is provided with a first through hole 71 penetrating through the tube wall along its thickness direction, and the first through hole 71 is communicated with the first tube 1 and the first sub-tube 7. The second tube 2 is internally provided with a second sub-tube 8, the second sub-tube 8 includes a flow channel and a tube wall surrounding the flow channel, a length direction of the flow channel is parallel to the length direction of the second tube 2, and the tube wall is provided with a second through hole 81 penetrating through the tube wall along its thickness direction, and the second through hole 81 is communicated with the second tube 2 and the flow channel of the second sub-tube 8. A plurality of first through holes 71 and a plurality of second through holes 81 are provided. A plurality of first through holes 71 are arranged at intervals along the length direction of the first tube 1 and a plurality of second through holes 81 are arranged at intervals along the length direction of the second tube 2. On the first plane, the number of projections of the first through holes 71 towards the first channel of the first heat exchange tube 5 is more than the number of projections of the first through holes 71 towards the second channel of the first heat exchange tube 5, and/or, the number of projections of the second through holes 81 towards the first channel of the first bent section 61 is more than the number of projections of the second through holes 81 towards the second channel of the first bent section 61.

Specifically, in some embodiments, the first sub-tube 7 is arranged in the first tube 1, and the first sub-tube 7 includes a tube wall and a flow channel, and the flow channel of the first sub-tube 7 is formed in the tube wall. In this embodiment, the length direction of the first sub-tube 7 is parallel to the length direction of the first tube 1, that is, both the first sub-tube 7 and the first tube 1 extend in the direction perpendicular to the page of FIG. 5. In this embodiment, the second sub-tube 8 is arranged in the second tube 2, which includes a tube wall and a flow channel, and the flow channel of the second sub-tube 8 is formed in the tube wall. The length direction of the second sub-tube 8 is parallel to the length direction of the second tube 2, that is, both the second sub-tube 8 and the second tube 2 extend in the direction perpendicular to the page of FIG. 5.

As shown in FIG. 5, in this embodiment, the tube wall of the first sub-tube 7 is provided with a first through hole 71, and the first through hole 71 is communicated with the first tube 1 and flow channel of the first sub-tube 7, thus the refrigerant in the first sub-tube 7 can flow into the first tube 1. In this embodiment, there are a plurality of rows and columns of the first through holes 71, the first through holes 71 in the same row are arranged at intervals along the length direction of the first sub-tube 7, and the first through holes 71 in the same column are arranged at intervals along a circumferential direction of the first sub-tube 7. In this embodiment, the tube wall of the first sub-tube 7 can be divided into a left tube wall and a right tube wall on both sides of a diameter of the first sub-tube 7 parallel to the length direction of the first heat exchange tube 5. As shown in FIG. 5, in this embodiment, the left tube wall faces the side of the first channel (first heat exchange tube) 51 and the right tube wall faces the side of the second channel (first heat exchange tube) 52. A plurality of first through holes 71 in the same column are located on the left and right tube walls respectively, and the number of first through holes 71 on the left tube wall in the same column is more than the number of the first through holes on the right tube wall.

Similarly, in some embodiments, the tube wall of the second sub-tube 8 is provided with a second through hole 81, and the second through hole 81 is communicated with the second tube 2 and the flow channel of the second sub-tube 8, thus the refrigerant in the second sub-tube 8 can flow into the second tube 2. In this embodiment, there are a plurality of rows and columns of second through holes 81, the second through holes 81 in the same row are arranged at intervals along the length direction of the second sub-tube 8, and the second through holes 81 in the same column are arranged at intervals along a circumferential direction of the second sub-tube 8. In this embodiment, the tube wall of the second sub-tube 8 can be divided into a lower tube wall and an upper tube wall on both sides of a diameter of the second sub-tube 8 parallel to the length direction of the first bent section 61. As shown in FIG. 5, the lower tube wall faces the side of the first channel (second heat exchange tube) 63 and the upper tube wall faces the side of the second channel (second heat exchange tube) 64. A plurality of second through holes 81 in the same column are located on the lower tube wall and the upper tube wall respectively, and the number of second through holes 81 on the lower tube wall in the same column is more than the number of second through holes 81 on the upper tube wall.

The different arrangement of the number of the first through holes 71 on the left tube wall and the number of the first through holes 71 on the right tube wall of the first sub-tube 7 enables more liquid-phrase refrigerant flowing out through the first sub-tube 7 to flow to the side close to the first channel (first heat exchange tube) 51, thus further enhancing the heat exchange efficiency. Similarly, the different arrangement of the number of second through holes 81 on the upper tube wall and the number of second through holes 81 on the lower tube wall of the second sub-tube 8 enables more liquid-phase refrigerant flowing out through the second sub-tube 8 to flow to the side close to the first channel (second heat exchange tube) 63, thus also further enhancing the heat exchange efficiency.

Figure 6:
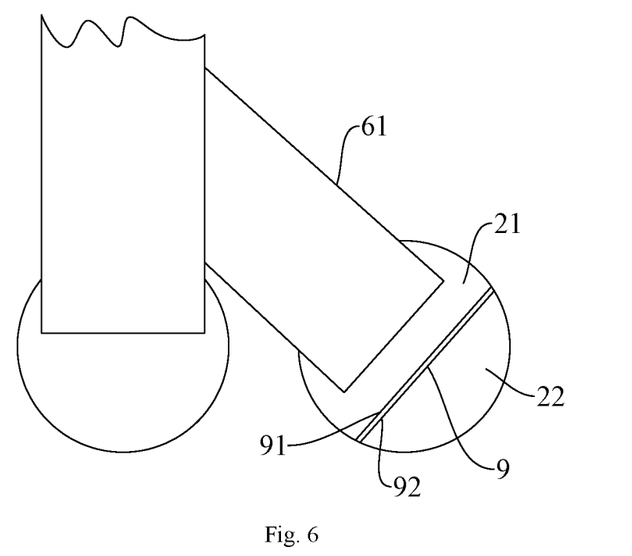
FIG. 6 is a first schematic diagram of a first plate of a heat exchanger according to an embodiment of the present disclosure.

In some embodiments, as shown in FIG. 6, the second tube 2 is provided with a first plate 9, the first plate 9 divides the flow channel of the second tube 2 into a first flow channel 21 and a second flow channel 22, and the partial tube section of the first bent section 61 is located in the first flow channel 21 and communicates with the first flow channel 21. The first plate 9 includes a partial inclined face, and the inclined face guides more refrigerant to flow to the first channel of the first bent section 61 when the heat exchanger is in operation.

Specifically, the first plate 9 is arranged in the second tube 2, and the first plate 9 extends along the length direction of the second tube 2 (a direction perpendicular to the page in FIG. 6). The first plate 9 divides the flow channel of the second tube 2 into a first flow channel 21 and a second flow channel 22, and the first flow channel 21 and the second flow channel 22 are relatively independent. The first bent section 61 of the second heat exchange tube 6 extends into one of the first flow channel 21 and the second flow channel 22, and while the first flow channel 21 is located above the second flow channel 22, the first bent section 61 extends into the first flow channel 21. The first plate 9 is arranged obliquely, and the side of the first plate 9 facing the first bent section 61 forms the partial inclined face. When the refrigerant flows along the first flow channel 21, the liquid-phrase refrigerant will flow down along the partial inclined face of the first plate 9, that is, the liquid-phrase refrigerant will gather at the side close to the first channel (second heat exchange tube) 63, which is beneficial to the improvement of heat exchange efficiency. In this embodiment, provision of the first plate 9 causes the flow channel of the second tube 2 to be divided into the first flow channel 21 and the second flow channel 22. During the operation of the heat exchanger, the refrigerant only flows along the first flow channel 21, the flow space for the refrigerant in the second tube 2 is reduced, and the height of the refrigerant is raised, thus more refrigerant can enter the first channel (second heat exchange tube) 63, and proportion of the liquid phase component is relatively high, which is beneficial to further improving the heat exchange efficiency.

Figure 7:
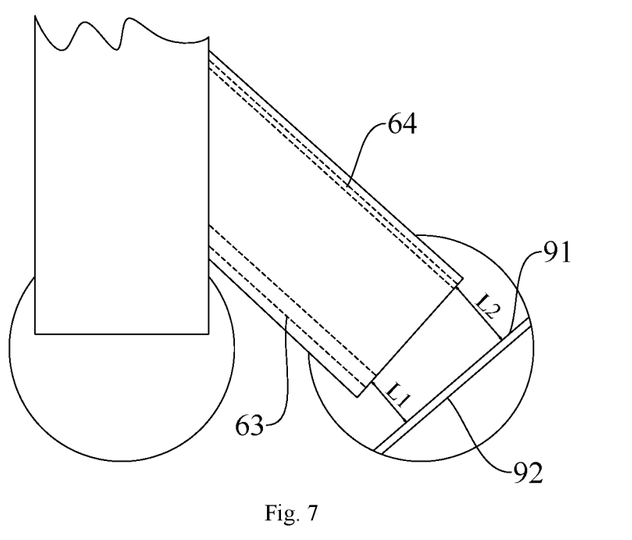
FIG. 7 is a second schematic diagram of a first plate of a heat exchanger according to an embodiment of the present disclosure.

In some embodiments, as shown in FIG. 7, the first plate 9 includes a first face 91 facing the first bent section 61 and a second face 92 facing away from the first bent section 61. At least part of the first face 91 is the inclined face. On the first plane, a projection line of the first plate 9 is inclined relative to the width direction of the first heat exchange tube 5. A minimum distance of a projection of an end face of the first channel of the first bent section 61 located in the second tube 2 to the first face 91 is L1. A minimum distance of a projection of an end face of the second channel of the first bent section 61 located in the second tube 2 to the first face 91 is L2, and the distance L1 is smaller than the distance L2.

Specifically, the first plate 9 is arranged in the second tube 2, and the first plate 9 is opposite to the first bent section 61. The first plate 9 has a first face 91 and a second face 92. In this embodiment, the first face 91 faces the side of the first bent section 61 and the second face 92 faces away from the side of the first bent section 61. The first plane can be regarded as the page of FIG. 7, and the projection line of the first plate 9 on the first plane forms an angle with the width direction of the first heat exchange tube 5. In the first plane, the minimum distance between projection of the end face of the first channel in the first bent section 61 and the first face 91 is L1, and the minimum distance between the projection of the end face of the second channel in the first bent section 61 and the first face 91 is L2. In this embodiment, the minimum distance L1 is smaller than the minimum distance L2. This size design enables more refrigerant to gather at the bottom of the first flow channel 21, which is beneficial to improvement of heat exchange efficiency.

Figure 8:
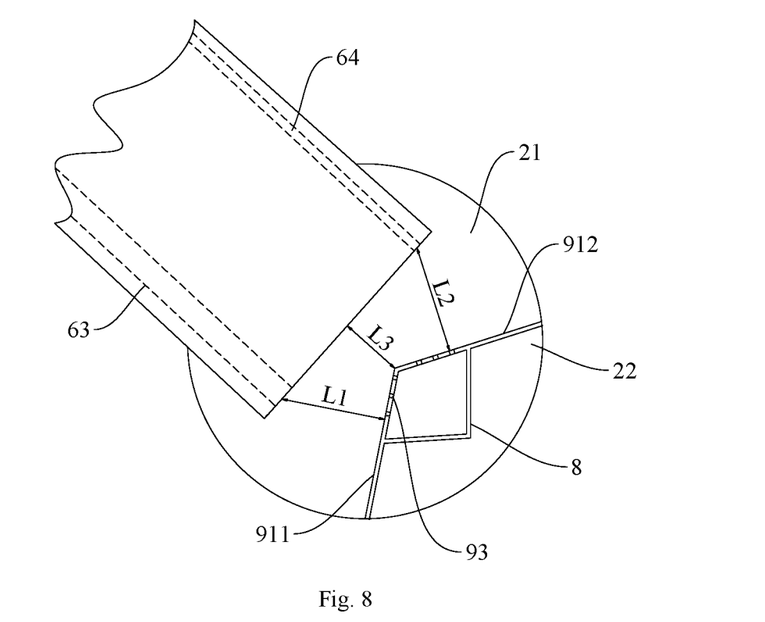
FIG. 8 is a first schematic diagram of an arrangement of a first plate and a second sub-tube of a heat exchanger according to an embodiment of the present disclosure.

In some embodiments, as shown in FIG. 8, the first plate 9 includes a first face 91 facing the first bent section 61 and a second face 92 facing away from the first bent section 61. The first face 91 includes two intersecting inclined faces, and projection lines of the two inclined faces of the first face 91 include at least two intersecting line segments in the first plane. A distance from an intersection of the two line segments to a projection of the end face of the first bent section 61 located in the second tube 2 is L3. The minimum distance from the projection of the end face of the first channel of the first bent section 61 located in the second tube 2 to the first face 91 is L1, and the minimum distance from the projection of the end face of the second channel of the first bent section 61 located in the second tube 2 to the first face 91 is L2, and L3 is less than L1 and/or L3 is less than L2.

Specifically, in this embodiment, the first plate 9 is arranged in the second tube 2. The first plate 9 has a first face 91 and a second face 92, with the first face 91 facing the side of the first bent section 61 and the second face 92 facing away from the side of the first bent section 61. In this embodiment, the first face 91 includes two intersecting inclined faces, namely a first inclined face 911 and a second inclined face 912. In this embodiment, the first plane is the page of FIG. 8, the projections of the first inclined plane 911 and the second inclined face 912 in the first plane are two line segments, the two line segments have a common endpoint, and the common endpoint forms the intersection of the two line segments. In this embodiment, the end face of the first bent section 61 is perpendicular to the first plane, and the projection of the end face of the first bent section 61 on the first plane is a projection line segment, and the distance between the projection line segment and the common endpoint of the above two line segments is L3. The projection of the end face of the first channel in the first bent section 61 on the first plane can be regarded as a point on the projection line segment, and the distance between this point and the first inclined face 911 is L1. The projection of the end face of the second channel in the first bent section 61 on the first plane can be regarded as another point on the projection line segment, and the distance between this point and the second inclined face 912 is L2. In this embodiment, the distance L3 is smaller than the distance L1, and the distance L3 is also smaller than the distance L2. This design makes a width of the first channel 21 near the first channel (second heat exchange tube) 63 narrower, which is beneficial for more refrigerant to enter the first channel (second heat exchange tube) 63. It can be understood that in some other embodiments, the distance L3 may be smaller than any one of the distance L1 and the distance L2.

In some embodiments, as shown in FIG. 8, the second sub-tube 8 is arranged in the second flow channel 22 of the second tube 2, and the first plate 9 includes a third through hole 93 penetrating through the first plate 9 along its thickness direction, and the third through hole 93 communicates with the first flow channel 21 and the flow channel of the second sub-tube 8. Specifically, the first plate 9 is arranged in the second tube 2, and the first plate 9 divides the flow channel of the second tube 2 into a first flow channel 21 and a second flow channel 22. In this embodiment, the second sub-tube 8 is arranged in the second flow channel 22, and the second sub-tube 8 is integrally formed with the first plate 9, that is, part of the tube wall of the second sub-tube 8 can be regarded as a part of the first plate 9, and a third through hole 93 is arranged in this part of first plate 9. The third through hole 93 communicates the first flow channel 21 with the flow channel of the second sub-tube 8, thus the refrigerant in the second sub-tube 8 can directly flow into the first flow channel 21, and this design makes the second sub-tube 8 not occupy the space of the first flow channel 21, which is beneficial to reducing the flow resistance.

Figure 9:
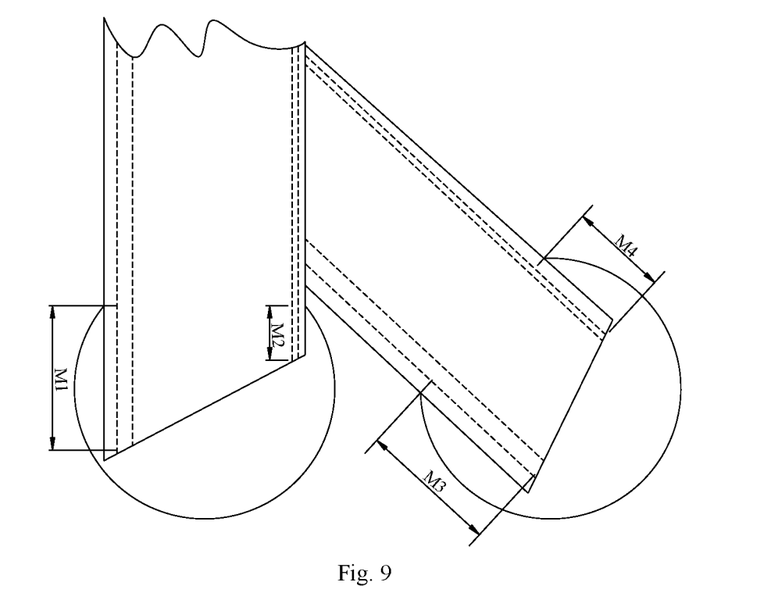
FIG. 9 is a schematic diagram of an arrangement showing that an end face of a heat exchange tube of a heat exchanger according to an embodiment of the present disclosure is an inclined face.

In some embodiments, as shown in FIGS. 2 and 9, at least part of the first heat exchange tube 5 is located in the first tube 1. In the first plane, the projection of the end face of the first heat exchange tube 5 located in the first tube 1 is at an angle with the projection of the cross section of the first heat exchange tube 5, the length of the first channel located in the first tube 1 is greater than the length of the second channel located in the first tube 1; and/or, in the first plane, the projection of the end face of the first bent section 61 located in the second tube 2 is at an angle with the projection of the cross section of the second heat exchange tube 6, and the length of the first channel located in the second tube 2 is greater than the length of the second channel located in the second tube 2.

Specifically, the first heat exchange tube 5 extends into the first tube 1, and the first plane can be regarded as the page of FIG. 9. The projection of the end face of the first heat exchange tube 5 in the first tube 1 on the first plane is an oblique line segment, the projection of the cross section of the first heat exchange tube 5 on the first plane is a horizontal line segment, and the horizontal line segment is at an angle with the oblique line segment. The length of the first channel (the first heat exchange tube) 51 in the first tube 1 is M1, and the length of the second channel (the first heat exchange tube) 52 in the first tube 1 is M2, and the length M1 is longer than the length M2. This design increases the chance that the end face of the first channel (the first heat exchange tube) 51 contacts the liquid refrigerant, which is beneficial for the refrigerant to enter the first channel more, improving the heat exchange efficiency.

Similarly, in this embodiment, the projection of the end face of the first bent section 61 in the first plane and the projection of the cross section of the first bent section 61 in the first plane are oblique line segments, and an included angle is formed between the two oblique line segments. The length of the first channel (second heat exchange tube) 63 in the second tube 2 is M3, and the length of the second channel (second heat exchange tube) 64 in the second tube 2 is M4, and the length M3 is longer than the length M4. This design enables the end face of the first channel (second heat exchange tube) 63 to be immersed in the liquid-phase refrigerant, thus facilitating the full absorption of the liquid-phase refrigerant and improvement of the heat exchange efficiency.

Figure 10:
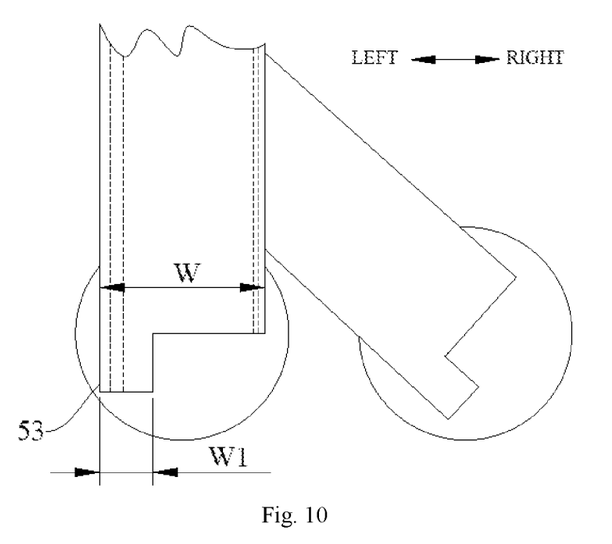
FIG. 10 is a schematic view of a first step portion of a heat exchanger according to an embodiment of the present disclosure.

In some embodiments, as shown in FIG. 10, the tube section of the first heat exchange tube 5 extending into the first tube 1 includes a first step portion 53, and the size of the first step portion 53 in the width direction of the first heat exchange tube 5 is smaller than the width of the first heat exchange tube 5. In the first plane, the projection of the end face of the first channel of the first heat exchange tube 5 coincides with the projection of the first step portion 53, and the width of the first step portion 53 is less than ½ of the width of the first heat exchange tube 5.

Specifically, one end of the first heat exchange tube 5 is provided with a first step portion 53, and the first step portion 53 is arranged in the first tube 1. In this embodiment, the first plane can be regarded as a page of FIG. 10. In the first plane, the projection of the end face of the first channel (first heat exchange tube) 51 and the projection of the first step portion 53 coincide. In the width direction of the first heat exchange tube 5, a width dimension of the first heat exchange tube 5 is W, a width dimension of the first step portion 53 is W1, and the width dimension W1 should be less than ½ of the width dimension W, that is, the ratio of the width dimension W1 to the width dimension W should not exceed 0.5, for example, it can be 0.1, 0.2, 0.3, 0.4, 0.5, etc. The design of the first step portion 53 enables the end face of the first channel (first heat exchange tube) 51 to be immersed in the liquid-phrase refrigerant, thereby facilitating more liquid-phrase refrigerant to enter the first channel and improving the heat exchange efficiency.

Hereinafter, a heat exchanger according to specific embodiments of the present disclosure will be described with reference to the drawings.

As shown in FIGS. 1 and 2, the heat exchanger of embodiments of the present disclosure includes a first assembly, a second assembly, a plurality of heat exchange tubes and a fin. The first assembly includes a first tube 1 and a second tube 2, and the second assembly includes a third tube 3 and a fourth tube 4. The second assembly is located above the first assembly. In this embodiment, the third tube 3 is located directly above the first tube 1, and the fourth tube 4 is located directly above the second tube 2. The first tube 1, the second tube 2, the third tube 3, and the fourth tube 4 all extend along a front-rear direction (the direction perpendicular to the page of FIG. 2).

As shown in FIG. 3, the heat exchange tube is a flat tube, and a plurality of channels are arranged in the heat exchange tube. The channels in the heat exchange tube can be divided into a first channel and a second channel according to the size of the flow sectional area. In the same heat exchange tube, the flow sectional area of the first channel is the largest, and the flow sectional area of the second channel is the smallest. A plurality of first channels are located on the left side of the heat exchange tube, and a plurality of second channels are located on the right side of the heat exchange tube. A plurality of third channels and a plurality of fourth channels are also arranged between the first channels and the second channels of the heat exchange tube, and the flow sectional areas of the third channel, the fourth channel or other channels between the first channels and the second channels are between the flow sectional area of the first channels and the flow sectional area of the second channels. In some embodiments, the channels in the heat exchange tubes are arranged along a direction from left to right according to the size of the flow sectional area. In some other embodiments, as shown in FIG. 3, the channels in the heat exchange tube are divided into multiple groups according to the size of the flow sectional area, and the number of channels in each group is one or more, and the channels in each group are arranged according to the size of the flow area along the direction from left to right.

As shown in FIG. 1, the heat exchange tubes can be divided into a first heat exchange tube 5 and a second heat exchange tube 6, and the first heat exchange tube 5 and the second heat exchange tube 6 are arranged at intervals in the front-rear direction. The first heat exchange tube 5 is a flat and straight tube, and the first heat exchange tube 5 extends along the up-down direction. A top end of the first heat exchange tube 5 is communicated with the first tube 1, and a bottom end of the first heat exchange tube 5 is communicated with the third tube 3. When the heat exchanger is in operation, the refrigerant flows through the first tube 1, the first heat exchange tube 5 and the third tube 3 in sequence.

As shown in FIG. 2, the second heat exchange tube 6 includes a first bent section 61, a second bent section 65 and a first straight section 62. The first straight section 62 is parallel to the first heat exchange tube 5, one end of the first bent section 61 is communicated with one end of the first straight section 62, the other end of the first bent section 61 is communicated with the third tube 3, the other end of the first straight section 62 is communicated with the second bent section 65, and the other end of the second bent section 65 is communicated with the fourth tube 4, that is, the first bent section 61 is located between the first straight section 62 and the third tube 3, and the second bent section 65 is located between the first straight section 62 and the fourth tube 4. In this embodiment, the length direction of the partial tube section of the first bent section 61 (from upper left to lower right in FIG. 2) and the length direction of the first straight section 62 (the up-down direction in FIG. 2) are at an obtuse angle, and the length direction of a partial tube section of the second bent section 65 (from the lower left to the upper right in FIG. 2) and the length direction of the first straight section 62 (the up-down direction in FIG. 2) are at an obtuse angle.

The fin is arranged between the first heat exchange tube 5 and the second heat exchange tube 6, and includes a plurality of first fins 10, one side of each first fin 10 is connected with the first heat exchange tube 5, and the other side of each first fin 10 is connected with the second heat exchange tube 6. A plurality of first fins 10 are arranged at intervals in the front-rear direction.

In some embodiments, the first channel (first heat exchange tube) 51 is located on the left side of the first heat exchange tube 5, the second channel (first heat exchange tube) 52 is located on the right side of the first heat exchange tube 5, the first channel (second heat exchange tube) 63 is located on the left side of the first bent section 61, and the second channel (second heat exchange tube) 64 is located on the right side of the first bent section 61. The page of FIG. 2 is defined as a first plane. In the first heat exchange tube 5 and the second heat exchange tube 6, the projection of at least one first channel (first heat exchange tube) 51, the projection of at least one second channel (first heat exchange tube) 52, the projection of at least one first channel (second heat exchange tube) 63, and the projection of at least one second channel (second heat exchange tube) 64 on the first plane are arranged in sequence along a direction from left to right.

Figure 15:
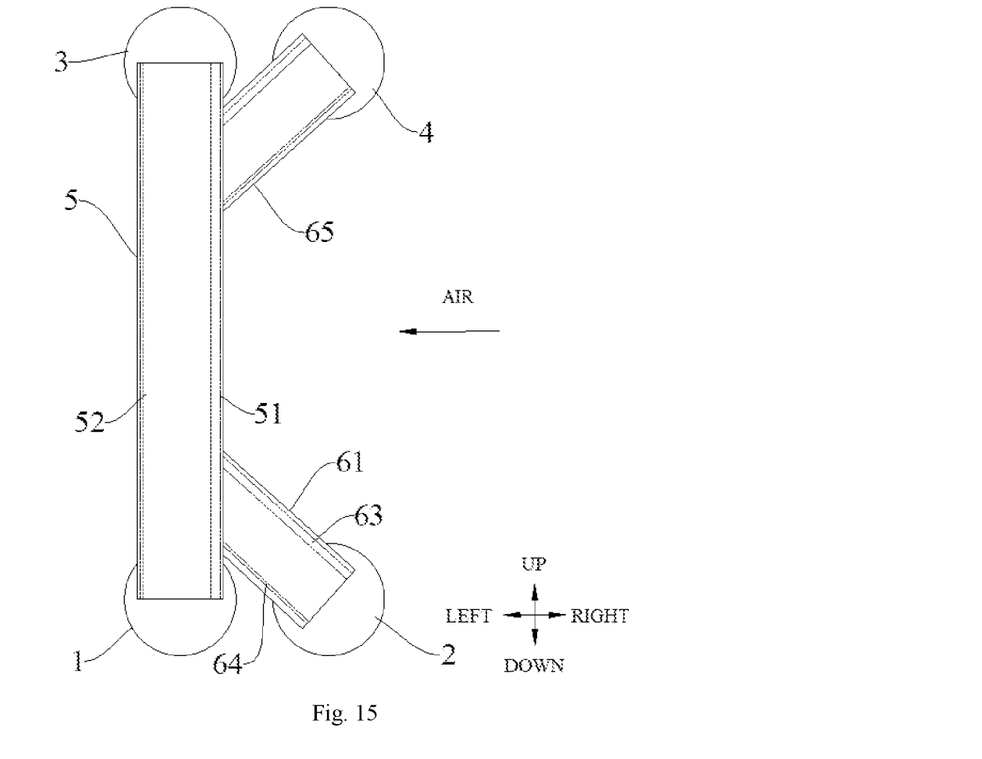
FIG. 15 is a second schematic side view of an overall structure of a heat exchanger according to an embodiment of the present disclosure.

It can be understood that in some other embodiments, as shown in FIG. 15, the first channel (first heat exchange tube) 51 can also be located on the right side of the first heat exchange tube 5, the second channel (first heat exchange tube) 52 can be located on the left side of the first heat exchange tube 5, the first channel (second heat exchange tube) 63 can also be located on the right side of the first bent section 61, and the second channel (second heat exchange tube) 64 is located on the left side of the first bent section 61. The page of FIG. 15 is defined as a first plane. In the first and second heat exchange tubes 5 and 6, the projection of at least one first channel (second heat exchange tube) 63, the projection of at least one second channel (second heat exchange tube) 64, the projection of at least one first channel (first heat exchange tube) 51 and the projection of at least one second channel (first heat exchange tube) 52 on the first plane are arranged in sequence along a direction from right to left.

As shown in FIG. 4, the first bent section 61 extends into the second tube 2, and the maximum length of the tube section of the first bent section 61 extends into the second tube 2 is H. In this embodiment, the second tube 2 is a circular tube, and the equivalent diameter of the second tube 2 is D. The ratio of the maximum length H to the equivalent diameter D may be ⅓.

As shown in FIG. 4, the extension direction of the projection of the second channel of the first heat exchange tube 5 on the first plane is consistent with the length direction of the first heat exchange tube 5, and the extension direction of the projection of the first channel of the first bent section 61 on the first plane is consistent with the length direction of the first bent section 61, an included angle b is formed between the length direction of the first heat exchange tube 5 and the length direction of the first bent section 61, and the included angle b may be 30 degrees.

In some embodiments, as shown in FIG. 5, a first sub-tube 7 is arranged in the first tube 1 of the heat exchanger, and a second sub-tube 8 is arranged in the second tube 2.

As shown in FIG. 5, the tube wall of the first sub-tube 7 is provided with a first through hole 71, and the first through hole 71 communicates the first tube 1 with the flow channel of the first sub-tube 7 such that the refrigerant in the first sub-tube 7 can flow into the first tube 1. The first through holes 71 are arranged in a plurality of rows and columns, the first through holes 71 in the same row are arranged at intervals along the length direction of the first sub-tube 7 (a direction perpendicular to the page in FIG. 5), and the first through holes 71 in the same column are arranged at intervals along the circumferential direction of the first sub-tube 7. In this embodiment, the tube wall of the first sub-tube 7 can be divided into a left tube wall and a right tube wall on both sides of the diameter of the first sub-tube 7 parallel to the length direction of the first heat exchange tube 5. As shown in FIG. 5, the left tube wall faces the side of the first channel (first heat exchange tube) 51 and the right tube wall faces the side of the second channel (first heat exchange tube) 52. A plurality of first through holes 71 in the same column are located on the left and right tube walls, respectively, and the number of first through holes 71 on the left tube wall in the same column is more than the number of first through holes 71 on the right tube wall.

In some embodiments, the tube wall of the second sub-tube 8 is provided with a second through hole 81, and the second through hole 81 communicates the second tube 2 with the flow channel of the second sub-tube 8 such that the refrigerant in the second sub-tube 8 can flow into the second tube 2. The second through holes 81 are arranged in a plurality of rows and columns, the second through holes 81 in the same row are arranged at intervals along the length direction of the second sub-tube 8 (a direction perpendicular to the page in FIG. 5), and the second through holes 81 in the same column are arranged at intervals along the circumferential direction of the second sub-tube 8. The tube wall of the second sub-tube 8 can be divided into a lower tube wall and an upper tube wall on both sides of the diameter of the second sub-tube 8 parallel to the length direction of the first bent section 61. As shown in FIG. 5, the lower tube wall faces the side of the first channel (second heat exchange tube) 63 and the upper tube wall faces the side of the second channel (second heat exchange tube) 64. A plurality of second through holes 81 in the same column are located on the lower tube wall and the upper tube wall respectively, and the number of second through holes 81 in the lower tube wall in the same column is more than the number of second through holes 81 in the upper tube wall.

In some embodiments, as shown in FIG. 8, a first plate 9 and a second sub-tube 8 are provided in the second tube 2 of the heat exchanger of embodiments of the present disclosure.

As shown in FIG. 8, the first plate 9 divides the flow channel of the second tube 2 into a first flow channel 21 and a second flow channel 22. The first plate 9 is arranged at an interval from the end face of the first bent section 61, and the first flow channel 21 is located above the second flow channel 22. The first bent section 61 extends into the first flow channel 21, and the second sub-tube 8 is arranged in the second flow channel 22. In this embodiment, the first plate 9 and the second sub-tube 8 are integrally formed, that is, a part of the tube wall of the second sub-tube 8 can be regarded as a part of the first plate 9, and a third through hole 93 is provided in this part of the first plate 9, and the third through hole 93 communicates the first flow channel 21 with the flow channel of the second sub-tube 8.

In some embodiments, as shown in FIG. 9, the end face of the first heat exchange tube 5 of the heat exchanger in the first tube 1 is an inclined face, and the end face of the first bent section in the second tube 2 is an inclined face.

As shown in FIG. 9, the length of the first channel (first heat exchange tube) 51 in the first tube 1 is M1, and the length of the second channel (first heat exchange tube) 52 in the first tube 1 is M2, and the length M1 is longer than the length M2. The length of the first channel (second heat exchange tube) 63 in the second tube 2 is M3, and the length of the second channel (second heat exchange tube) 64 in the second tube 2 is M4, and the length M3 is longer than the length M4.

In some embodiments, as shown in FIG. 10, the end of the first heat exchange tube 5 of the heat exchanger located in the first tube 1 is provided with a first step portion 53, and the end of the first bent section 61 located in the second tube 2 is provided with a second step portion.

The page of FIG. 10 is regarded as the first plane, and in the first plane the projection of the end face of the first channel (first heat exchange tube) 51 coincides with the projection of the first step portion 53, that is, the first step portion 53 is provided on the left side of the end of the first heat exchange tube 5. In the first plane, the projection of the end face of the first channel (second heat exchange tube) 63 coincides with the projection of the second step portion, that is, the second step portion is provided at the lower side of the end of the first bent section 61.

The ratio of the width dimension of the first step portion 53 to the width dimension of the first heat exchange tube 5 is ⅓, and the ratio of the width dimension of the second step portion to the width dimension of the first bent section 61 is ⅓.

Figure 11:
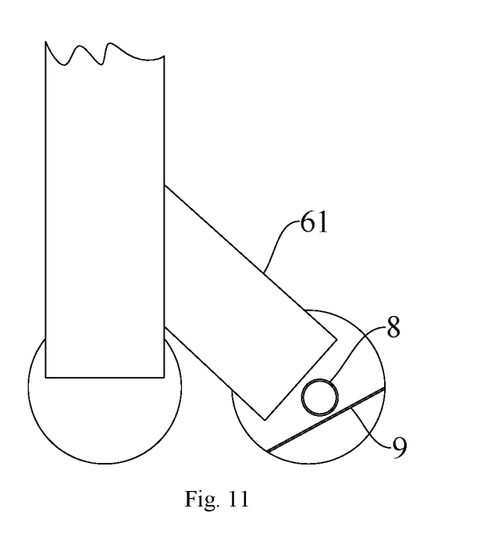
FIG. 11 is a second schematic diagram of an arrangement of a first plate and a second sub-tube of a heat exchanger according to an embodiment of the present disclosure.

In some other embodiments, as shown in FIG. 11, the second tube 2 of the heat exchanger is provided with a first plate 9 and a second sub-tube 8.

The first plate 9 divides the flow channel of the second tube 2 into a first flow channel 21 and a second flow channel 22, the first flow channel 21 is located above the second flow channel 22, and the first bent section 61 extends into the first flow channel 21. In this embodiment, the second sub-tube 8 is arranged in the first flow channel 21, and the second sub-tube 8 is arranged at an interval from the first plate 9, and the length direction of the second sub-tube 8 is parallel to the length direction of the second tube 2. The second sub-tube 8 includes a tube wall, and the tube wall of the second sub-tube 8 is provided with a second through hole 81.

Figure 12:
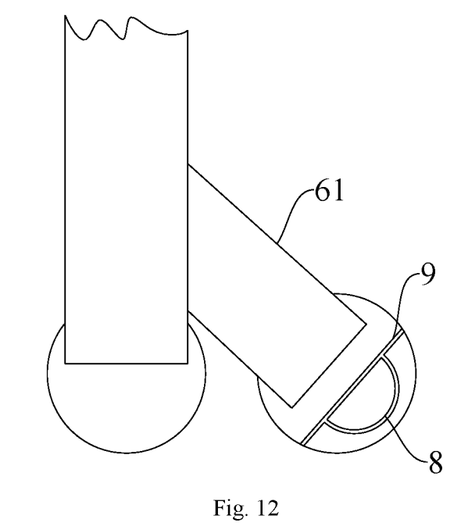
FIG. 12 is a third schematic diagram of an arrangement of a first plate and a second sub-tube of a heat exchanger according to an embodiment of the present disclosure.

In some embodiments, as shown in FIG. 12, the heat exchanger includes a first assembly, a second assembly, a plurality of heat exchange tubes and a fin. The first assembly includes a first tube 1 and a second tube 2, and the second assembly includes a third tube 3 and a fourth tube 4. The first assembly, the second assembly, the plurality of heat exchange tubes and the fin can be identical with those in above-mentioned embodiments, and will not be repeated here. The difference is that the first plate 9 and the second sub-tube 8 are arranged in the second tube 2 in this embodiment.

The first plate 9 divides the flow channel of the second tube 2 into a first flow channel 21 and a second flow channel 22, the first flow channel 21 is located above the second flow channel 22, and the first bent section 61 extends into the first flow channel 21. In this embodiment, the second sub-tube 8 is arranged in the second flow channel 22, and the second sub-tube 8 is integrally formed with the first plate 9, that is, part of the tube wall of the second sub-tube 8 can be regarded as a part of the first plate 9. In this embodiment, the cross section of the second sub-tube 8 is semicircular.

Figure 13:
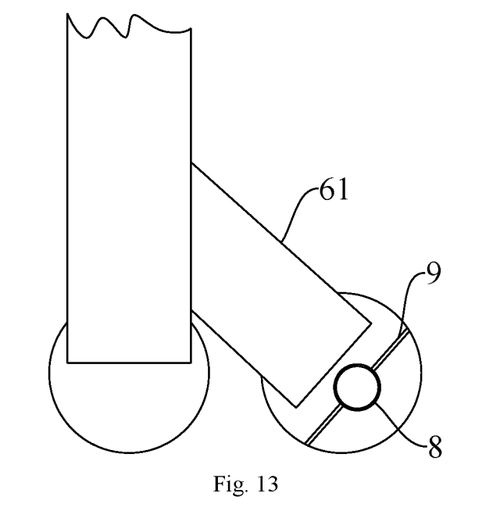
FIG. 13 is a fourth schematic diagram of an arrangement of a first plate and a second sub-tube of a heat exchanger according to an embodiment of the present disclosure.

In some embodiments, as shown in FIG. 13, the heat exchanger is provided with a first plate 9 and a second sub-tube 8 in the second tube 2.

The first plate 9 divides the flow channel of the second tube 2 into a first flow channel 21 and a second flow channel 22, the first flow channel 21 is located above the second flow channel 22, and the first bent section 61 extends into the first flow channel 21. In this embodiment, the second sub-tube 8 is integrally formed with the first plate 9, and the first plate 9 includes a first face 91 facing the first bent section 61 and a second face 92 facing away from the first bent section 61. The second sub-tube 8 is located at a middle of the first plate 9, one side of the second sub-tube 8 protrudes from the first face 91, and the other side of the second sub-tube 8 protrudes from the second face 92. In this embodiment, the second sub-tube 8 is a circular tube.

Figure 14:
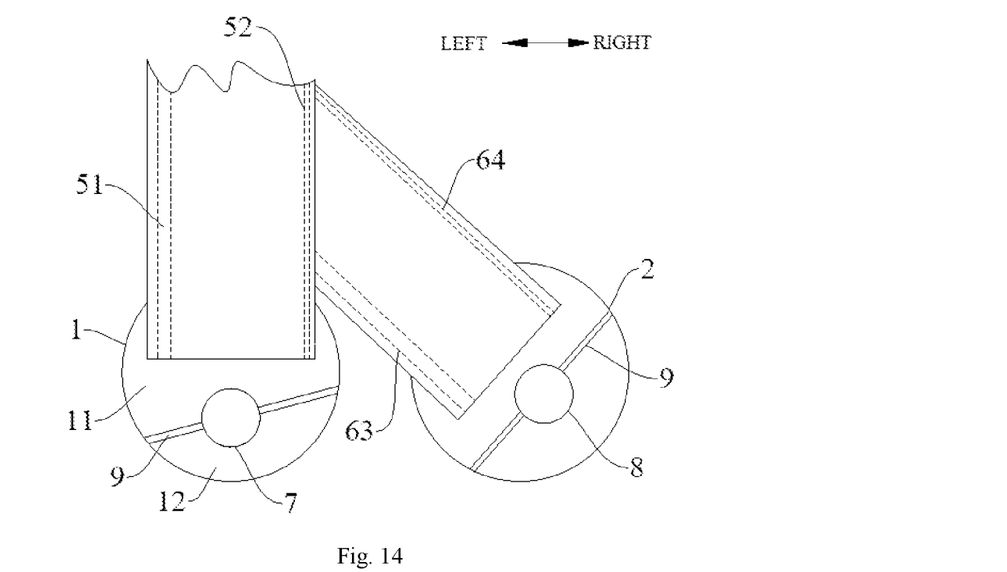
FIG. 14 is a fifth schematic diagram of an arrangement of a first plate and a second sub-tube of a heat exchanger according to an embodiment of the present disclosure.

In some other embodiments, as shown in FIG. 14, a first sub-tube 7 is arranged in the first tube 1 of the heat exchanger, and a second sub-tube 8 is arranged in the second tube 2. The first tube 1 and the second tube 2 are both provided with the first plate 9.

The first plate 9 in the second tube 2 divides the flow channel of the second tube 2 into a first flow channel 21 and a second flow channel 22, the first flow channel 21 is located above the second flow channel 22, and the first bent section 61 extends into the first flow channel 21. In this embodiment, the second sub-tube 8 is integrally formed with the first plate 9 in the second tube 2. The first plate 9 in the second tube 2 includes a first face 91 facing the first bent section 61 and a second face 92 facing away from the first bent section 61. The second sub-tube 8 is arranged at the middle of the first plate 9 in the second tube 2, one side of the second sub-tube 8 protrudes from the first face 91 and the other side of the second sub-tube 8 protrudes from the second face 92. In this embodiment, the second sub-tube 8 is a circular tube.

The first plate 9 in the first tube 1 divides the flow channel of the first tube 1 into a third flow channel 11 and a fourth flow channel 12. The third flow channel 11 is located above the fourth flow channel 12, and the bottom end of the first heat exchange tube extends into the third flow channel 11. In this embodiment, the first sub-tube 7 is integrally formed with the first plate 9 in the first tube 1. The first plate 9 in the first tube 1 includes a third face facing the first heat exchange tube and a fourth face facing away from the first heat exchange tube. The first sub-tube 7 is located at the middle of the first plate 9 in the first tube 1, one side of the first sub-tube 7 protrudes from the third face and the other side of the first sub-tube 7 protrudes from the fourth face. In this embodiment, the first sub-tube 7 is a circular tube.

In description of the present disclosure, terms indicating an orientation or positional relationship such as "central", "longitudinal", "lateral", "length", "width", "thickness", "up", "down", "front", "rear", "left", "right", "vertical", "horizontal", "top", "bottom", "inner", "outer", "clockwise", "counterclockwise", "axial", "radial" and "circumferential" as well as derivative thereof, should be construed as the orientation as then described or as shown in the drawings under discussion. These relative terms are for convenience of description and do not intend to indicate or imply that the devices or elements referred to must have a specific orientation, and be constructed and operated in a specific orientation, and therefore should not be construed as limiting the present disclosure.

In addition, terms such as "first" and "second" are used herein for purposes of description and are not intended to indicate or imply relative importance or significance or the number of indicated technical features. Therefore, the features defined as "first" and "second" can explicitly or implicitly include at least one of these features. In the description of the present disclosure, "a plurality of" means at least two, such as two, three, etc., unless otherwise specifically defined.

In the present disclosure, unless otherwise specifically defined, terms such as "installed", "connected", "coupled" and "fixed" and variations thereof should be appreciated broadly, unless expressly described otherwise, and for example, could refer to fixed connection, detachable connection or integrated connection, as well as mechanical connection, electrically connection or communicatively connection; it can also refer to direct connection or indirect connection through an intermediary, as well as the internal connection of two elements or the interaction between two elements. It would be appreciated by those skilled in the art that the specific meanings of the above terms in the present disclosure can be understood according to specific situations.

In the present disclosure, unless specified and limited otherwise, that a first feature is "above" or "below" a second feature can be in direct contact or indirectly through an intermediary. Moreover, the terms "above", "on" and "on top of" may mean that the first feature is directly above or obliquely above the second feature, or simply mean that the horizontal height of the first feature is higher than the second feature. The terms "below", "under" and "on bottom of" can mean that the first feature is directly below or obliquely below the second feature, or simply mea that the horizontal height of the first feature is smaller than the second feature.

In the description of the specification, reference to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Additionally, without contradicting each other, those skilled in the art could combine the different embodiments or examples and features of the different embodiments or examples described in the specification.

Although explanatory embodiments have been shown and described, it would be appreciated by those skilled in the art that the above embodiments are illustrative and cannot be construed to limit the present disclosure, and changes, alternatives, and modifications can be made in the embodiments within the scope of the present disclosure.

What is claimed is:

1. A heat exchanger, comprising:
   a first assembly comprising a first tube and a second tube;
   a second assembly comprising a third tube and a fourth tube;
   a plurality of heat exchange tubes, a peripheral contour of a cross section of the heat exchange tube being generally flat, the heat exchange tube comprising a plurality of channels extending along a length direction of the heat exchange tube, the plurality of channels being arranged at intervals in a width direction of the heat exchange tube, the plurality of channels comprising a first channel and a second channel, a flow sectional area of the first channel on the cross section of the heat exchange tube being larger than flow sectional areas of other channels on the cross section of the heat exchange tube, and a flow sectional area of the second channel on the cross section of the heat exchange tube being smaller than flow sectional areas of other channels on the cross section of the heat exchange tube;
   the plurality of heat exchange tubes comprising a first heat exchange tube and a second heat exchange tube, a first end of the first heat exchange tube in the length direction being communicated with the first tube, and a second end of the first heat exchange tube in the length direction being communicated with the third tube, to communicate the first tube and the third tube;
   the second heat exchange tube being communicated with the second tube and the fourth tube, the second heat exchange tube comprising a first bent section and a first straight section, a first end of the first bent section being communicated with the second tube, and a second end of the first bent section being communicated with a first end of the first straight section, and the first heat exchange tube and the second heat exchange tube are arranged at intervals in a length direction of the first tube; and a fin comprising a first fin, at least part of the first fin being connected with the first heat exchange tube and at least part of the first fin being connected with the second heat exchange tube in the length direction of the first tube, and the first heat exchange tube, the first fin and the second heat exchange tube being sequentially arranged in the length direction of the first tube, and two or more first fins are provided;

wherein a plane perpendicular to the length direction of the first tube and parallel to the width direction and the length direction of the first heat exchange tube is defined as a first plane, in the first plane, a length direction of a projection of a partial tube section of the first bent section of the second heat exchange tube is at an angle with a length direction of a projection of the first straight section of the second heat exchange tube, and in the width direction of the first heat exchange tube, a projection of the second channel of the first heat exchange tube is located between a projection of the first channel of the first heat exchange tube and a projection of the first channel of a part of the first bent section, and a projection of the first channel of the first bent section is located between the projection of the second channel of the first heat exchange tube and a projection of the second channel of the part of the first bent section, wherein the second tube is internally provided with a first plate, the first plate divides a flow channel of the second tube into a first flow channel and a second flow channel, the partial tube section of the first bent section is located in the first flow channel and communicated with the first flow channel, and the first plate comprises a partial inclined face, and the inclined face guides more refrigerant to flow to the first channel of the first bent section when the heat exchanger is in operation.

2. The heat exchanger according to claim 1, wherein the first bent section of the second heat exchange tube is at least partially arranged in the second tube, a maximum length of the partial tube section of the first bent section arranged in the second tube is H, an equivalent diameter of the second tube is D, and a ratio of the maximum length H to the equivalent diameter D is greater than or equal to ⅓ and less than or equal to ⅔.

3. The heat exchanger according to claim 1, wherein a plurality of first channels are provided, and the plurality of first channels are arranged at intervals along the width direction of the heat exchange tube, and/or, a plurality of second channels are provided, and the plurality of second channels are arranged at intervals along the width direction of the heat exchange tube.

4. The heat exchanger according to claim 1, wherein a projection of the second channel of at least one first heat exchange tube on the first plane partially intersects with a projection of the first channel of at least one first bent section on the first plane, and an included angle b of an intersecting part is greater than 20 degrees and less than 65 degrees.

5. The heat exchanger according to claim 1, wherein, the first tube is internally provided with a first sub-tube, the first sub-tube comprises a flow channel and a tube wall surrounding the flow channel, a length direction of the flow channel is parallel to the length direction of the first tube, and the tube wall is provided with a first through hole penetrating through the tube wall along a thickness direction of the tube wall, and the first through hole is communicated with the first tube and the first sub-tube;

the second tube is internally provided with a second sub-tube, the second sub-tube comprises a flow channel and a tube wall surrounding the flow channel, a length direction of the flow channel is parallel to the length direction of the second tube, and the tube wall is provided with a second through hole penetrating through the tube wall along a thickness direction of the tube wall, and the second through hole is communicated with the second tube and the flow channel of the second sub-tube;

a plurality of first through holes and a plurality of second through holes are provided, the plurality of first through holes are arranged at intervals along the length direction of the first tube, and the plurality of second through holes are arranged at intervals along the length direction of the second tube, on the first plane, a number of projections of the first through holes towards the first channel of the first heat exchange tube is more than a number of projections of the first through holes towards the second channel of the first heat exchange tube, and/or, a number of projections of the second through holes towards the first channel of the first bent section is more than a number of projections of the second through holes towards the second channel of the first bent section.

6. The heat exchanger according to claim 1, wherein the first plate comprises a first face facing the first bent section and a second face facing away from the first bent section, at least part of the first face is the inclined face, and a projection line of the first plate is inclined relative to the width direction of the first heat exchange tube on the first plane, and a minimum distance from a projection of an end face of the first channel of the first bent section located in the second tube to the first face is L1 and a minimum distance from a projection of an end face of the second channel of the first bent section located in the second tube to the first face is L2, and the distance L1 is smaller than the distance L2.

7. The heat exchanger according to claim 1, wherein the first plate comprises a first face facing the first bent section and a second face facing away from the first bent section, the first face comprises two intersecting inclined faces, and in the first plane, projection lines of the two inclined faces of the first face at least comprise two intersecting line segments, a distance from an intersection point of the two line segments to a projection of an end face of the first bent section located in the second tube is L3, a minimum distance from a projection of an end face of the first channel of the first bent section located in the second tube to the first face is L1, and a minimum distance from a projection of an end face of the second channel of the first bent section located in the second tube to the first face is L2, and L3 is less than L1 and/or L3 is less than L2.

8. The heat exchanger according to claim 1, wherein a second sub-tube is arranged in the second flow channel of the second tube, and the first plate comprises a third through hole penetrating through the first plate along a thickness direction of the first plate, and the third through hole is communicated with the first flow channel and the flow channel of the second sub-tube.

9. The heat exchanger according to claim 1, wherein at least part of the first heat exchange tube is located in the first tube, and in the first plane, a projection of an end face of the first heat exchange tube is at an angle with a projection of the cross section of the first heat exchange tube, and a length of the first channel located in the first tube is greater than a length of the second channel located in the first tube, and/or in the first plane, a projection of an end face of the first bent section located in the second tube is at an angle with a projection of the cross section of the second heat exchange tube, and a length of the first channel located in the second tube is greater than a length of the second channel located in the second tube.

10. The heat exchanger according to claim 9, wherein a tube section of the first heat exchange tube extending into the first tube comprises a first step portion, a size of the first step portion in the width direction of the first heat exchange tube is smaller than a width of the first heat exchange tube, and the projection of the end face of the first channel of the first heat exchange tube coincides with a projection of the first step portion in the first plane, and a width of the first step portion is less than ½ of the width of the first heat exchange tube.

11. The heat exchanger according to claim 1, wherein the heat exchange tube comprises a plurality of first channels and a plurality of second channels, the plurality of first channels and the plurality of second channels are arranged at intervals along the width direction of the heat exchange tube, and the plurality of first channels are located on a left side of the heat exchange tube and the plurality of second channels are located on a right side of the heat exchange tube.

12. The heat exchanger according to claim 11, wherein a plurality of third channels and a plurality of fourth channels are arranged between the plurality of first channels and the plurality of second channels; a flow sectional area of the third channel and a flow sectional area of the fourth channel is between the flow sectional area of the first channel and the flow sectional area of the second channel.

13. The heat exchanger according to claim 1, wherein a projection of at least one first channel of the first heat exchange tube on the first plane, a projection of at least one second channel of the first heat exchange tube on the first plane, a projection of at least one first channel of the second heat exchange tube on the first plane and a projection of at least one second channel of the second heat exchange tube on the first plane are arranged in sequence from left to right.

14. The heat exchanger according to claim 1, wherein the first heat exchange tube extends into the first tube, a projection of an end face of the first heat exchange tube in the first tube on the first plane is an oblique line segment, a projection of the cross section of the first heat exchange tube on the first plane is a horizontal line segment, and the horizontal line segment is at an angle with the oblique line segment; a length of the first channel of the first heat exchange tube in the first tube is M1, and a length of the second channel of the first heat exchange tube in the first tube is M2, and the length M1 is longer than the length M2.

15. The heat exchanger according to claim 8, wherein the second sub-tube is integrally formed with the first plate.

16. The heat exchanger according to claim 8, wherein a cross section of the second sub-tube is semicircular.

17. The heat exchanger according to claim 1, wherein a second sub-tube is arranged in the first flow channel of the second tube, the second sub-tube is arranged at an interval from the first plate, the second sub-tube comprises a tube wall, and the tube wall of the second sub-tube is provided with a second through hole penetrating through the tube wall along a thickness direction of the tube wall.

18. The heat exchanger according to claim 1, wherein a second sub-tube is integrally formed with the first plate, the first plate includes a first face facing the first bent section and a second face facing away from the first bent section; the second sub-tube is located at a middle of the first plate, a first side of the second sub-tube protrudes from the first face, and a second side of the second sub-tube protrudes from the second face.

19. The heat exchanger according to claim 5, wherein the first tube is integrally provided with a second plate, the second plate in the first tube divides the flow channel of the first tube into a third flow channel and a fourth flow channel, the third flow channel is located above the fourth flow channel, and the bottom end of the first heat exchange tube extends into the third flow channel, the first sub-tube is integrally formed with the second plate in the first tube, the second plate in the first tube includes a third face facing the first heat exchange tube and a fourth face facing away from the first heat exchange tube, the first sub-tube is located at the middle of the second plate in the first tube, a first side of the first sub-tube protrudes from the third face and a second side of the first sub-tube protrudes from the fourth face.

* * * * *